US009765527B2

(12) United States Patent
Hart et al.

(10) Patent No.: US 9,765,527 B2
(45) Date of Patent: Sep. 19, 2017

(54) INTERLOCKING SAFETY GRIP

(71) Applicant: Andrew J Hart Enterprises Limited, Woodbridge (CA)

(72) Inventors: Andrew J. Hart, Glencairn (CA); Peter George Murray, Midland (CA)

(73) Assignee: Andrew J Hart Enterprises Limited, Woodbridge, Ontario (CA)

( * ) Notice: Subject to any disclaimer, the term of this patent is extended or adjusted under 35 U.S.C. 154(b) by 660 days.

(21) Appl. No.: 13/677,743

(22) Filed: Nov. 15, 2012

(65) Prior Publication Data

US 2014/0134359 A1 May 15, 2014

(51) Int. Cl.

| | |
|---|---|
| ***B29D 22/00*** | (2006.01) |
| ***E04F 11/18*** | (2006.01) |
| ***A47K 17/02*** | (2006.01) |
| *A61G 7/05* | (2006.01) |

(52) U.S. Cl.

CPC ........ *E04F 11/1808* (2013.01); *A47K 17/022* (2013.01); *A61G 7/0507* (2013.01); *Y10T 428/13* (2015.01); *Y10T 428/24355* (2015.01)

(58) Field of Classification Search

CPC . A47K 17/022; A61G 7/0507; E04F 11/1808; Y10T 428/13

See application file for complete search history.

(56) References Cited

U.S. PATENT DOCUMENTS

| | | | | |
|---|---|---|---|---|
| 3,848,480 A | 11/1974 | Oseroff et al. | | |
| 6,854,163 B1 | 2/2005 | Ruana | | |
| 7,040,642 B2 | 5/2006 | Lowry | | |
| 7,931,385 B1 | 4/2011 | Smith | | |
| 7,934,701 B2 | 5/2011 | Kay | | |
| 2003/0159250 A1 | 8/2003 | Ruana | | |
| 2005/0102868 A1 | 5/2005 | Ruana | | |
| 2005/0160526 A1* | 7/2005 | Korn | ...................... | A47K 3/003 4/577.1 |
| 2007/0086852 A1* | 4/2007 | Goad | .................. | A47K 17/022 403/292 |
| 2010/0001246 A1 | 1/2010 | Kay | | |
| 2010/0037971 A1 | 2/2010 | Scherer | | |
| 2013/0133467 A1* | 5/2013 | Slone | ........................... | 74/551.9 |

OTHER PUBLICATIONS

The Packaging User's Handbook; p. 109; F.A. Paine; 1996.*
Ebay Oury Grips Mountain Bike Grips Glow-In-The-Dark, retrieved from the Internet on Jan. 20, 2012.
Stairglow Emergency Exit Stairwell Products, retrieved from the Internet on Jan. 20, 2012.

(Continued)

*Primary Examiner* — James Yager
(74) *Attorney, Agent, or Firm* — Philip C. Mendes da Costa; Bereskin & Parr LLP/S.E.N.C.R.L., s.r.l.

(57) ABSTRACT

A safety grip system comprises first and second safety grips that are mountable to a support structure. Each safety grip comprises a main body sized to overlie at least a portion of the support structure and have a textured exterior surface. The first and second safety grips are interlockable such that when the first safety grip is non-rotatably mounted to the support structure, the second safety grip is also non-rotatably mounted to the support structure.

6 Claims, 17 Drawing Sheets

(56) References Cited

OTHER PUBLICATIONS

Green Glow Stick Handle Grip, retrieved from the Internet on Jan. 20, 2012.
Oury Soft rubber Mountain Bike Grips (17 colors), retrieved from the Internet on Jan. 24, 2012.
GripLink: About us, retrieved from the Internet on Jan. 19, 2012.
GripLink: Common Questions, retrieved from the Internet on Jan. 19, 2012.
GripLink: Workplace Info, retrieved from the Internet on Jan. 19, 2012.

* cited by examiner

INTERLOCKING SAFETY GRIP

FIELD OF THE INVENTION

This invention relates to a safety grip system and, in particular, to interlockable safety grips which are mountable to a support structure, such as a support pole, a grab bar, a handrail, a bath rail, a toilet rail and the like, to provide assistance to, e.g. the elderly and the infirm.

BACKGROUND

It is known to provide support poles, grab bars, handrails and the like for people who are elderly of otherwise require support to stand or walk. In order to assist users, it is known to provide a grip to such structures. See for example, U.S. Pat. No. 6,854,163 which discloses a releasably attachable grip. Different types of covers are also known. For example, U.S. Pat. No. 7,040,642 discloses a cover for a wheelchair grip. This patent discloses a grip ring cover that comprises an inner pad constructed of a soft resilient material and an outer sleeve constructed of a durable material that is resistant to slippage and extreme temperature changes. The outer sleeve may also include reflective or luminescent material.

US2010-0001246 also discloses a safety handrail. The handrail is provided with a light emission component which is provided in a channel element (see paragraph [0015]). The handrail also includes a living hinge element that may be formed during manufacturing, so as to assist in assembling the handrail apparatus over existing handrails (see paragraph [0016]). A texture may be provided on the outer surface of the handrail (see paragraph [0025]).

US 2010/0037971 discloses a conduit cover which can also be used as a cover for hand rails in a building (see paragraph [0060]). The cover is formed from a resilient material and has a C-shape that can be opened to fit over a conduit. The cover self-tightens around the conduit, thus creating a frictional attachment (see paragraph [0027]). The cover may include a glow-in-the-dark or reflective layer. An important feature of handrail systems which are utilized by the elderly and infirm is the ability of the handrail to remain in a static position during use. For example, if a grip is provided over a support pole and the grip were to move longitudinally or rotationally when pressure is applied to the grip by a user, then the user could stumble and injure themselves. Accordingly, it is important that not only the support structure which is utilized is stable, but that any grip that is mounted to the support structure is itself also stable.

SUMMARY

This application relates to a safety grip system comprising at least two safety grips which are interlockable. Accordingly, if one of the safety grips is secured in position on a support structure and interlocked with the second safety grip, the first safety grip will inhibit the movement of the second safety grip on the support structure. Accordingly, the safety grip system comprises a plurality of modular interlocking members. The support structure may be a support pole, a grab bar, a handrail, a bath rail, a toilet rail or the like. Accordingly, if one of the safety grips is non-rotatably secured in position on a pole or bar and interlocked with the second safety grip, the first safety grip will inhibit the rotation of the second safety grip about the pole or bar.

The modular element may be formed by, e.g., molding but any other process may be used. The modular elements preferably have a continuous perimeter so as to fully surround a rail or the like on which they are mounted. Accordingly, the modular elements may be a hollow elongate body with an exterior textured surface of any desired length.

It will be appreciated that each of the first and second safety grips may themselves be secured to a support structure (e.g. a rail or pole). For example, they may be secured thereto by an adhesive, a mechanical fastener or the like. It is possible that one of the members may become loose over time. For example, a screw may come loose or the adhesive that secures a safety grip to a bar or pole may weaken, allowing the rotation of one of the safety grips. However, if the two safety grips interlock (e.g. they have inter-engagement members), then the safety grip which is still secured in position will inhibit the movement of the other safety grip.

It will be appreciated that various different designs for interlocking members may be utilized. For example, one of the safety grips may have a finger or protrusion which extends into a recess in the adjacent safety grip. Alternately, one safety grip may overlie and clamp onto another safety grip.

By utilizing any interlocking means, a safety grip system may be assembled from a plurality of individual safety grips which interlock such that, when assembled, safety grips create an interlocked system which inhibits the movement of members of the system.

In accordance with one aspect, there is provided a safety grip system comprising first and second safety grips that are mountable to a support structure, each safety grip comprising a main body sized to overlie at least a portion of the support structure and having a textured exterior surface, the first safety grip is interlockable with the second safety grip such that when the first safety grip is non-rotatably mounted to the support structure, the second safety grip is also non-rotatably mounted to the support structure.

In any embodiment, the first safety grip may comprise a hollow, rigid main body sized to overlie at least a portion of a first support member of the support structure.

In any embodiment, the first safety grip may be securable to the support member by mechanical means or an adhesive.

In any embodiment, the main body of the first safety grip may have a longitudinal axis and at least one longitudinally extending finger that is receivable in a longitudinally extending recess of the second safety grip.

In any embodiment, the second safety grip may comprise a hollow, rigid main body sized to overlie at least a portion of a second support member of the support structure and the second support member extends in a different direction to the first support member In any embodiment, the second safety grip may have interlocking members that overlie a portion of the first safety grip.

In any embodiment, the second safety grip may comprise a hollow, rigid main body sized to overlie at least a portion of the first support member of the support structure and may have an opening the receive therein a portion of the support structure that extends in a different direction to the first support member. Preferably, the main body of the first safety grip has a longitudinal axis and at least one longitudinally extending finger that is receivable in a longitudinally extending recess of the second safety grip.

In any embodiment, the textured exterior surface of the first safety grip may be luminescent.

In any embodiment, the main body of the first safety grip maybe made of a luminescent material.

In any embodiment, the texturing of the exterior surface may comprise a plurality of projections having a height of from 0.5 mm to 5 mm and preferably from 1 mm to 3 mm.

In accordance with another aspect, there is provided a safety grip system comprising first and second safety grips that mountable to a support structure, each safety grip comprising a main body sized to overlie at least a portion of the support structure and having a textured exterior surface and interlocking members, the interlocking members are configured such that the main body of the first safety grip extends in a different direction than the main body of the second safety grip when the first and second interlocking members are interlocked whereby the first and second safety grips are each non-rotatably mounted to the support structure.

In any embodiment, the textured exterior surface of the first safety grip may be luminescent.

In any embodiment, the main body of the first safety grip maybe made of a luminescent material.

In any embodiment, the texturing of the exterior surface may comprise a plurality of projections having a height of from 0.5 mm to 5 mm and preferably from 1 mm to 3 mm.

In accordance with another aspect, there is provided a safety grip system comprising first and second safety grips that mountable to a support structure, each safety grip comprising a main body sized to overlie at least a portion of the support structure and having a textured exterior surface, the first safety grip is non-rotationally mountable to the support structure and has first engagement members, the second safety grip has second engagement members that inter-engage the first engagement members whereby the inter-engagement of the first and second engagement members non-rotationally secures the second safety grip to the support structure.

In any embodiment, the textured exterior surface of the first safety grip may be luminescent.

In any embodiment, the main body of the first safety grip maybe made of a luminescent material.

In any embodiment, the texturing of the exterior surface may comprise a plurality of projections having a height of from 0.5 mm to 5 mm and preferably from 1 mm to 3 mm.

DRAWINGS

These and other advantages will be understood in conjunction with the following description of the preferred embodiments in which.

DESCRIPTION OF THE PREFERRED EMBODIMENT

This detailed description discloses various features of safety grip system 10. It will be appreciated that an embodiment may use one or more of these features. The safety grip system may be used with any support structure known in the art, such as a bed rail, grab bar, support pole, a bath rail, a toilet rail or the like. Further, as will be appreciated, the safety grip system may be of indefinite length as various safety grips may be assembled into a single system as may be desired.

Figure 1:
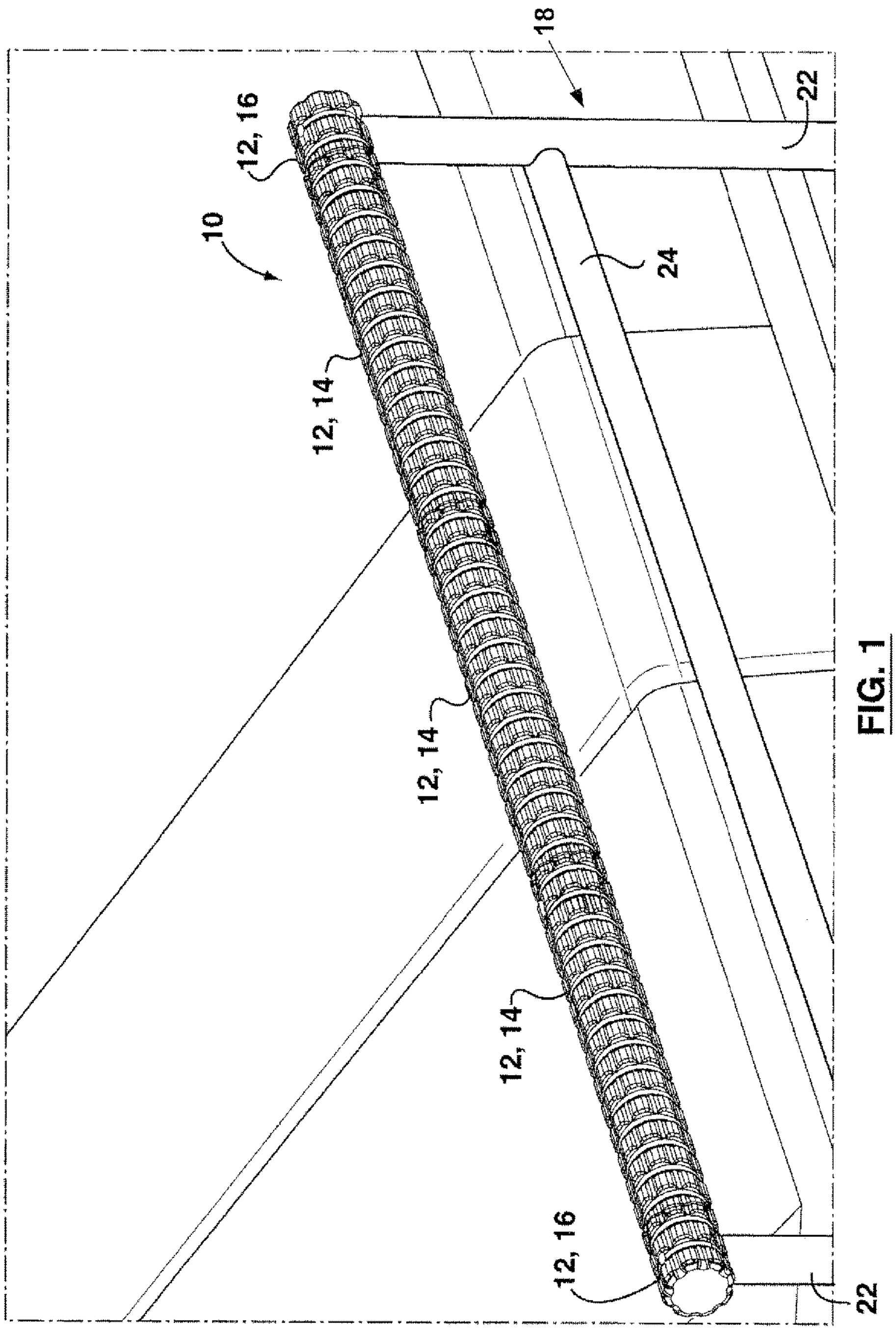
FIG. 1 is a perspective view of a bed rail wherein a safety grip system is provided on the top rail.
Figure 2:
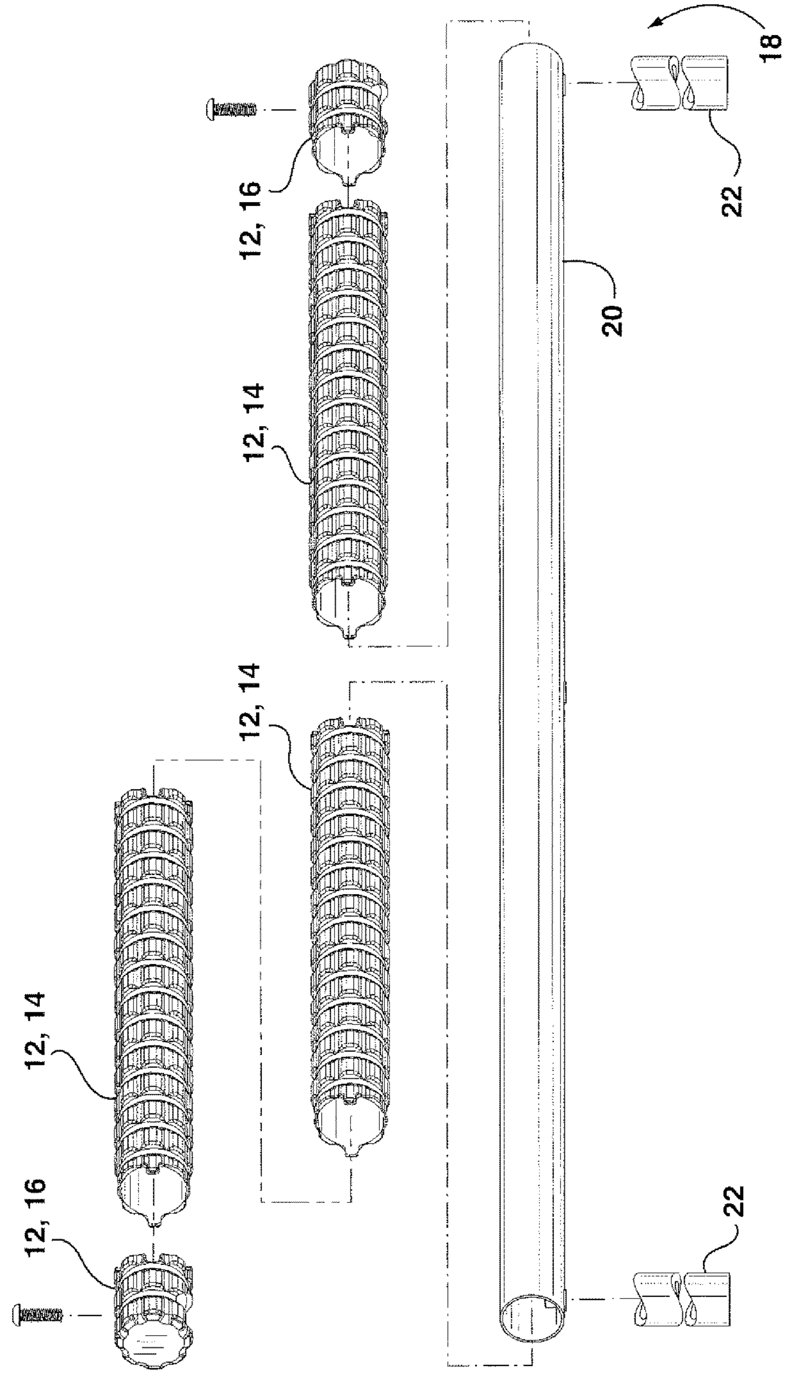
FIG. 2 is an exploded view of FIG. 1.

Referring to FIGS. 1 and 2, safety grip system 10 is shown comprising a plurality of intermediate safety grips 14 positioned between safety grip end members 16. As exemplified, the safety grips 12 are mounted on top rail 20 of structure 18 (which in this case is a bed rail). Accordingly, when a user is lying in bed, they may utilize bed rail 18 by placing their hand on safety grips 12 so as to assist in leveraging themselves into a sitting and, optionally, a standing position.

It will be appreciated that bed rail 18 may be of any design known in the art. As exemplified, bed rail 18 comprises a top rail 20, a cross rail 24 and two spaced apart side vertical rails 22. It will also be appreciated that other members known in the art are included to secure bed rail 18 into position. It will also be appreciated that safety grips 12 may be provided at alternate locations on bed rail 18, such as cross-rail 24 and/or side rails 22.

It will be appreciated that safety grips 12 may be provided across only a portion of top rail 20. Further, intermediate safety grips 14 may be of any length such that more or fewer intermediate safety grips 14 may be utilized. For example, if intermediate safety grip 14 has a sufficient length, only a single intermediate safety grip 14 may be utilized. However, it is preferred that shorter intermediate safety grips 14 are utilized such that a more flexible modular safety grip system 10 is provided.

Figure 3A:
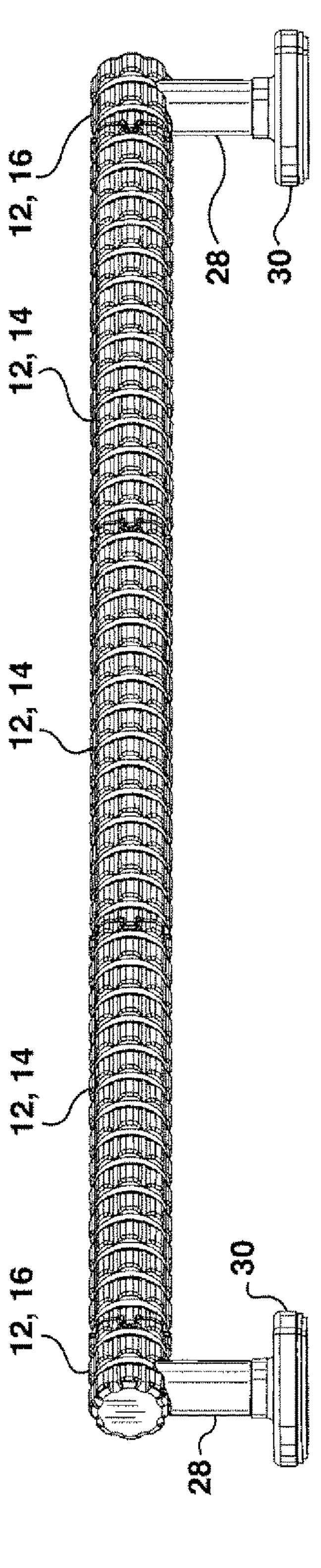
FIG. 3A is a perspective view of a grab bar having a safety grip system provided thereon.
Figure 3B:
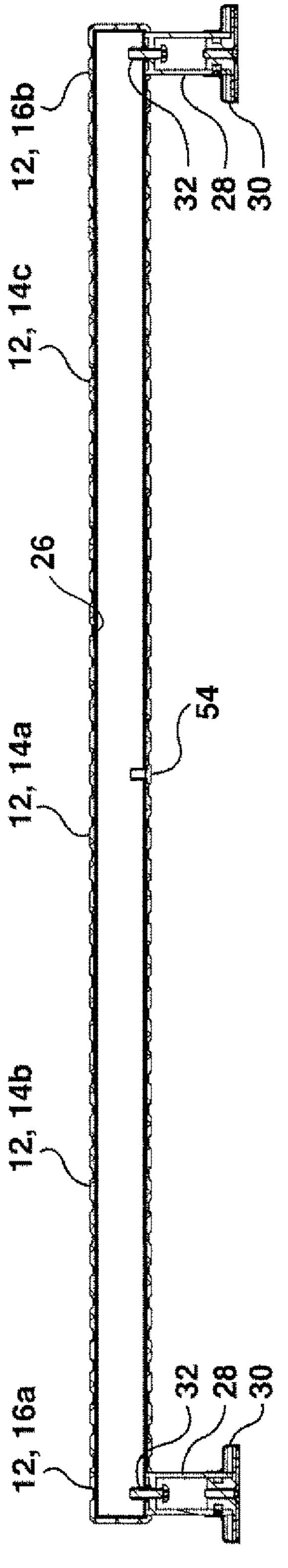
FIG. 3B is a vertical section through the grab bar of FIG. 3A.
Figure 3C:
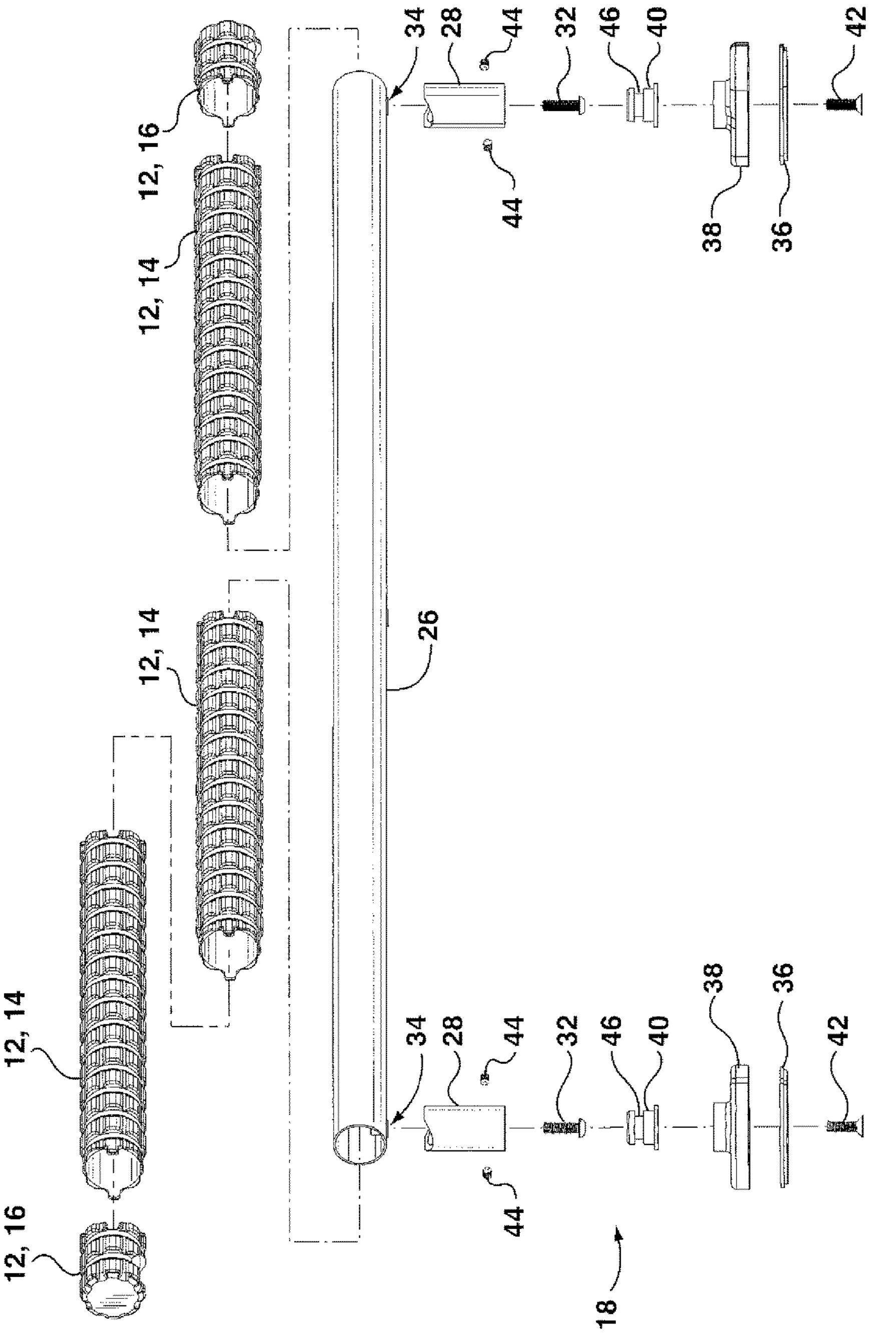
FIG. 3C is an exploded view of the embodiment of FIG. 3A.

FIGS. 3A-3C exemplify the use of safety grips 12 on support structure 18 which, in this embodiment, comprises a grab bar. A grab bar comprises a cross rail 26 and spaced apart wall mount rails 28 which extend between cross rail 26 and end plates 30. As shown in FIG. 3B, wall mount rails 28 may be secured to an end of cross rail 26 by a screw 32 which is receivable in a threaded hole provided in cross rail 26. End plate assembly 30 may be of any particular construction known in the art which can be used to secure grab bar 18 to a wall or the alike. For example, referring to FIG. 3C, end plate 30 may comprise a plate 36 which is adapted from mounting to a wall (e.g. by screw openings provided therein). A cover shroud 38 may be provided to cover plate

36. Insert 40 is received in the open end of wall mount rail 28 and may be are secured therein by any means known in the art, such as by set screws 44 which are receivable in groove 46 of insert 40. The entire end plate assembly 30 may be secured together by screw 42 which extends through plate 36 and shroud 38 into a threaded recess in insert 40.

As shown in FIG. 3B, the center intermediate safety grip 14 may be secured to cross rail 26 by a screw 54. As will be discussed subsequently, end members 16 are secured in position by wall mount rail 28 passing therethrough.

As exemplified, safety grip system 10 is shown comprising three intermediate safety grips 14 positioned between safety grip end members 16. Once again, it will be appreciated that safety grips 12 may be provided across only a portion of cross rail 26. Further, intermediate safety grips 14 may be of any length such that more or fewer intermediate safety grips 14 may be utilized.

Figure 3D:
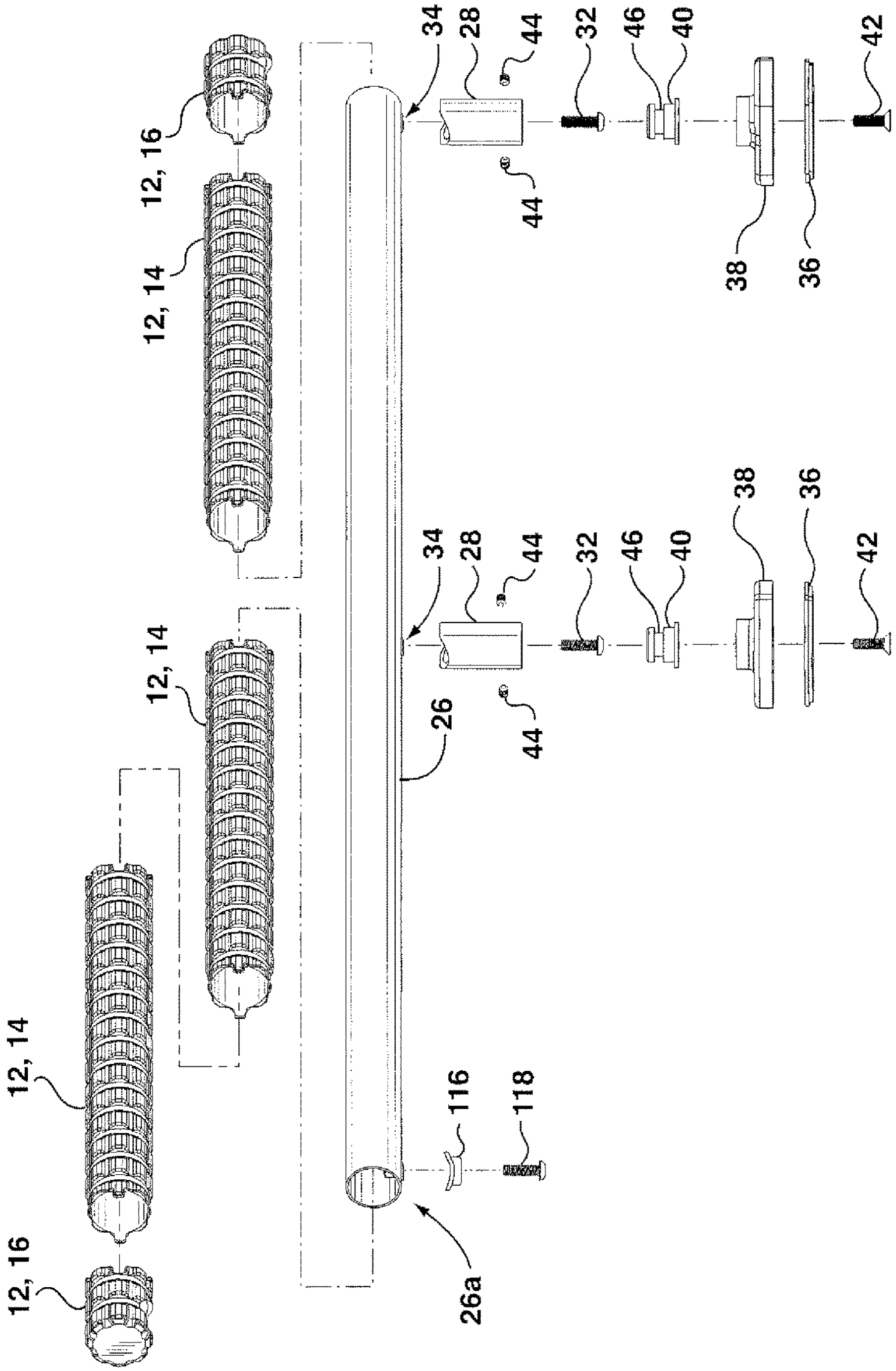
FIG. 3D is an exploded view of an alternate safety grip system applied to a grab bar.
Figure 3E:
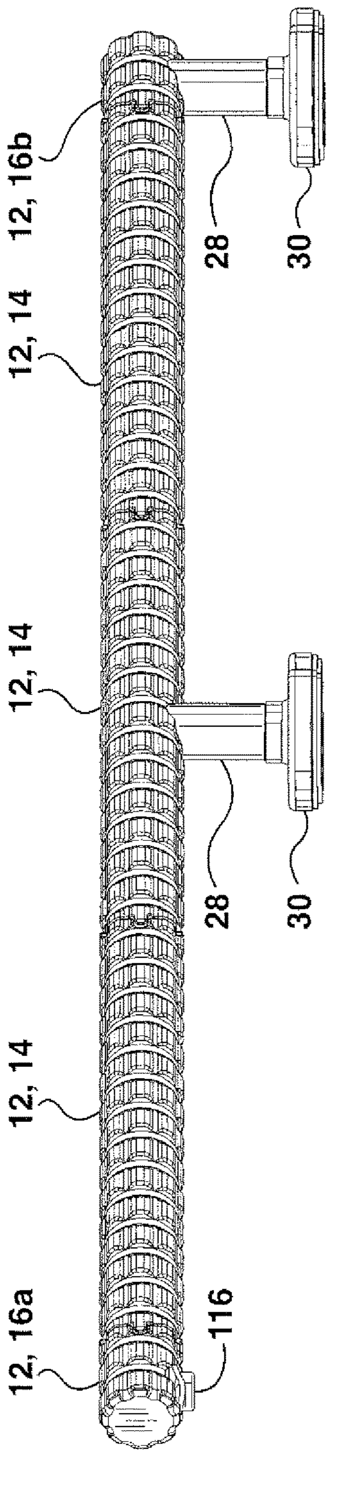
FIG. 3E is a perspective view of the grab bar of FIG. 3D in an assembled condition.
Figure 3F:
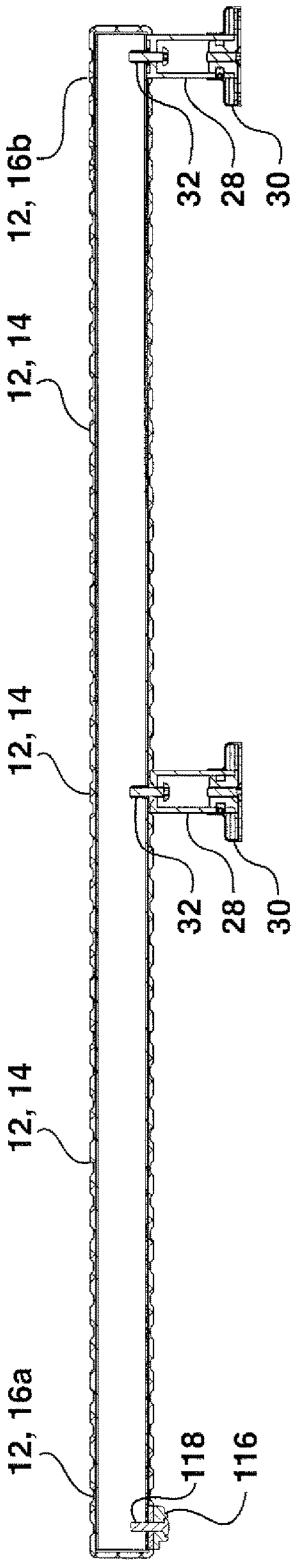
FIG. 3F is a vertical section through the grab bar of FIG. 3F.

FIGS. 3D-3F exemplify a further embodiment of a safety grip system. In this embodiment, the safety grip system 10 is applied to a grab bar 18 wherein the cross rail 26 extends past one of the wall mount rails 28. This embodiment is the same as that shown in FIGS. 3A-3C except that one end member 16 is provided on end 26*a* of cross-rail 26 which does not have a wall mount rail 28. Therefore, end member 16*a* is secured in position by an alternate means. As exemplified, a cap member 116 may be secured to cross rail 26 by a screw 118. Cap member 116 seats in opening 58 of end member 16*a* so as to non-rotationally mount end member 16*a* on cross rail 26.

Figure 3G:
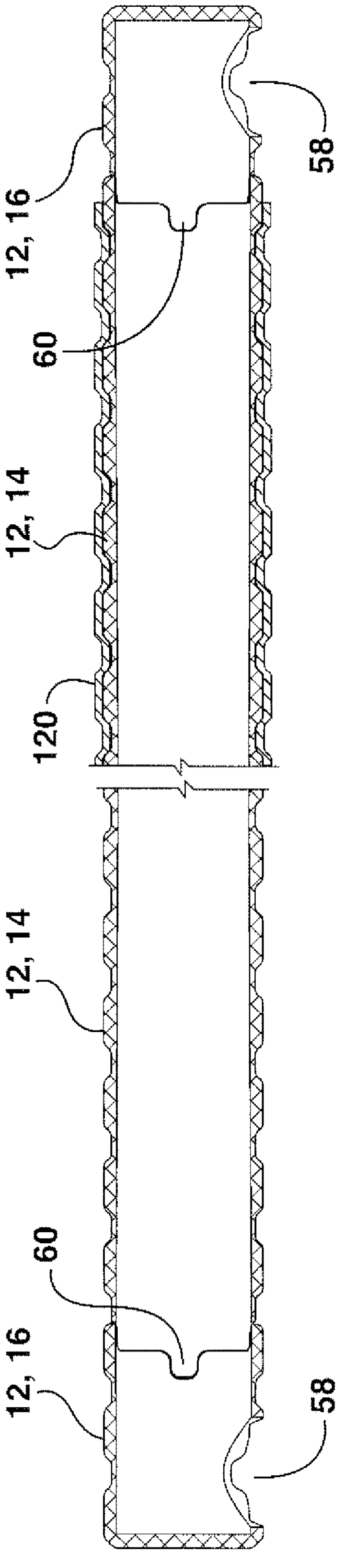
FIG. 3G is a vertical section through the grab bar of FIG. 3F wherein only the safety grips are shown.
Figure 4A:
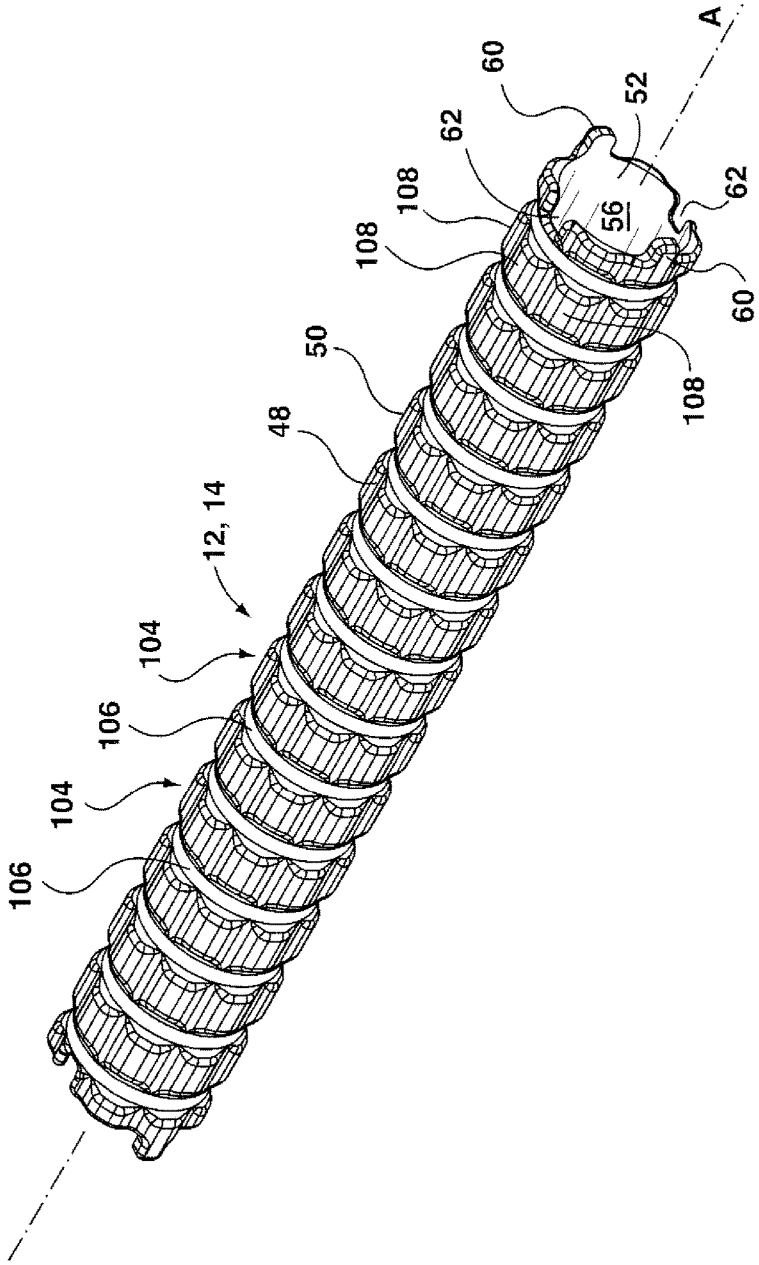
FIG. 4A is a perspective view of an intermediate safety grip according to one embodiment.

The structure of an embodiment of the safety grips 12 will now be discussed with reference to the FIGS. 3G and 4A-4D. As shown in FIG. 4A, intermediate safety grip 14 comprises a main body 48 and a textured exterior surface 50. Further, intermediate grip member 14 is a hollow body having a continuous perimeter around the longitudinal axis A, and, accordingly, has an internal cavity 52.

As exemplified in FIG. 3B, intermediate safety grip 14 overlies cross rail 26. Safety grips 12 may have any desired internal diameter and are preferably sized to overlie at least a portion of a support member (e.g. cross rail 26) of a support member (e.g. grab bar 18 of FIG. 3A). Preferably, cavity 52 is sized so as to slide onto cross rail 26 or the like. However, it is preferred that the outer diameter of cross rail 26 is only slightly smaller than the internal diameter of cavity 52 such that safety grip 12 will not move radially with respect to cross rail 26. Alternately, the outer diameter of cross rail 26 may be essentially the same as inner diameter of cavity 52 so as to create a running locking fit. Safety grip 12 may be sized in any manner so as to overlie the support member upon which it is to be mounted provided that the safety grip 12 may be non-rotatably mounted in position.

It will be appreciated that at least one member of the safety grip system 10 will be non-rotatably mounted in position. That safety grip member may be non-rotatably mounted in position via a number of means. For example, it may be secured in position by an adhesive, mechanical means or engagement with a portion of support structure 18, or the like. It will be appreciated that other means may be utilized to secure one or more of the safety grips 12 in position.

For example, a safety grip 12 may be secured to a support member (e.g. cross rail 26) by an adhesive applied to the outer surface of cross rail 26 and/or the inner surface 56 of safety grip 12. Any adhesive known in the art, such as contact cement, a cyanoacrylate adhesive or the like may be used.

Alternately, or in addition, a mechanical fastening means such as a pin, bolt, rivet or a screw 54, may be used to secure a safety grip 12 to a support member (e.g. cross rail 26 as shown in FIG. 3B). Accordingly, the support member may have an opening provided and the mechanical fastener may extend through the opening to engage the support member (e.g., cross rail 26).

Figure 4B:
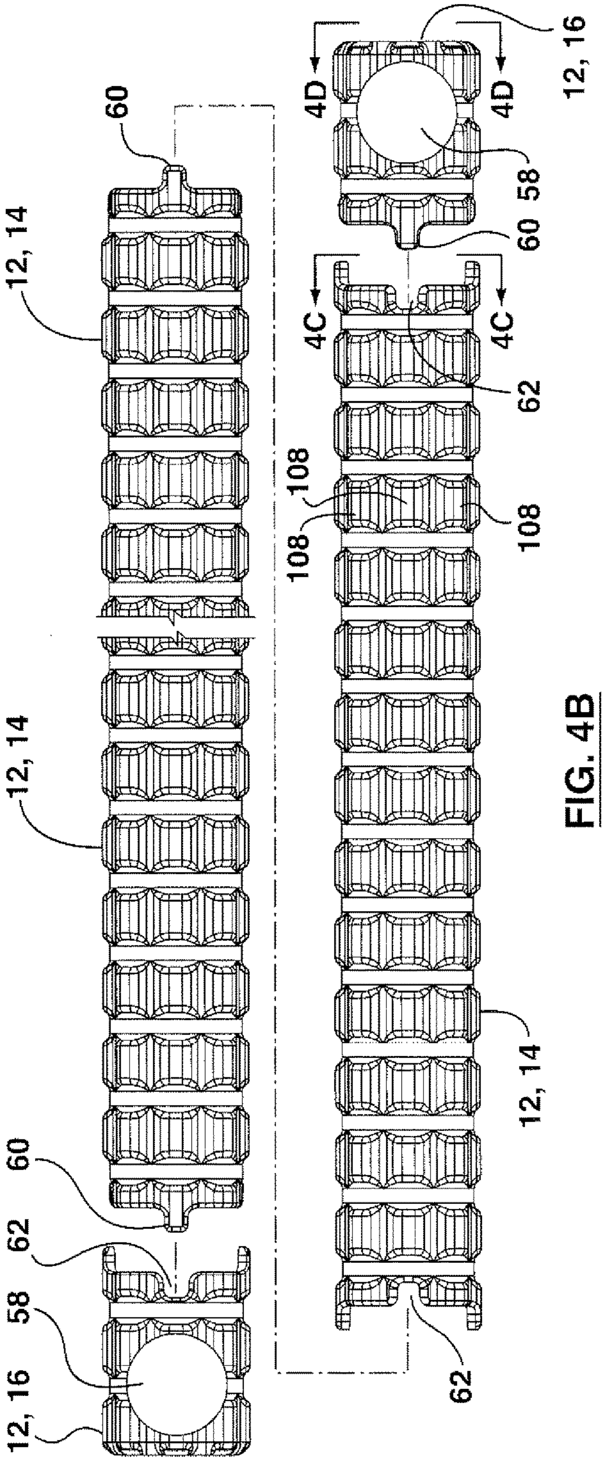
FIG. 4B is an exploded bottom plan view of the safety grips shown in FIG. 3G.
Figure 4D:
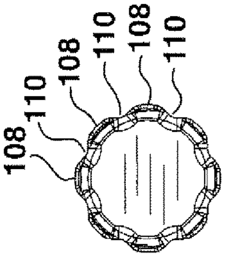
FIG. 4D is an end view of another safety grip shown in FIG. 4B.
Figure 4C:
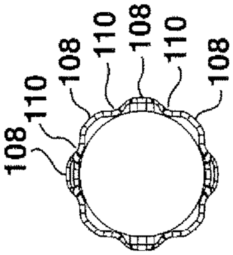
FIG. 4C is an end view of the intermediate safety grip that is shown in FIG. 4A.
Figure 5:
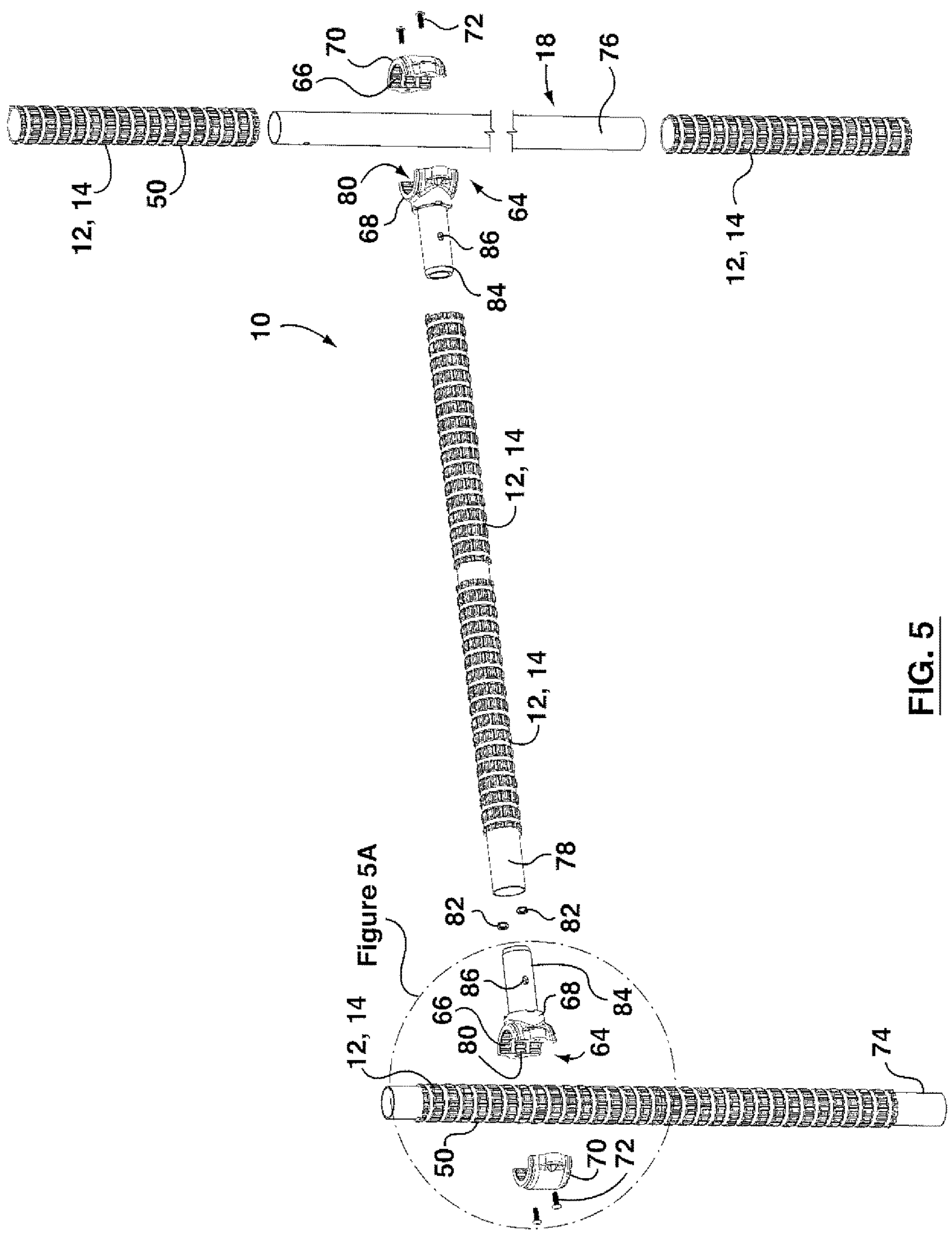
FIG. 5 is an exploded view of another safety grip system.
Figure 5A:
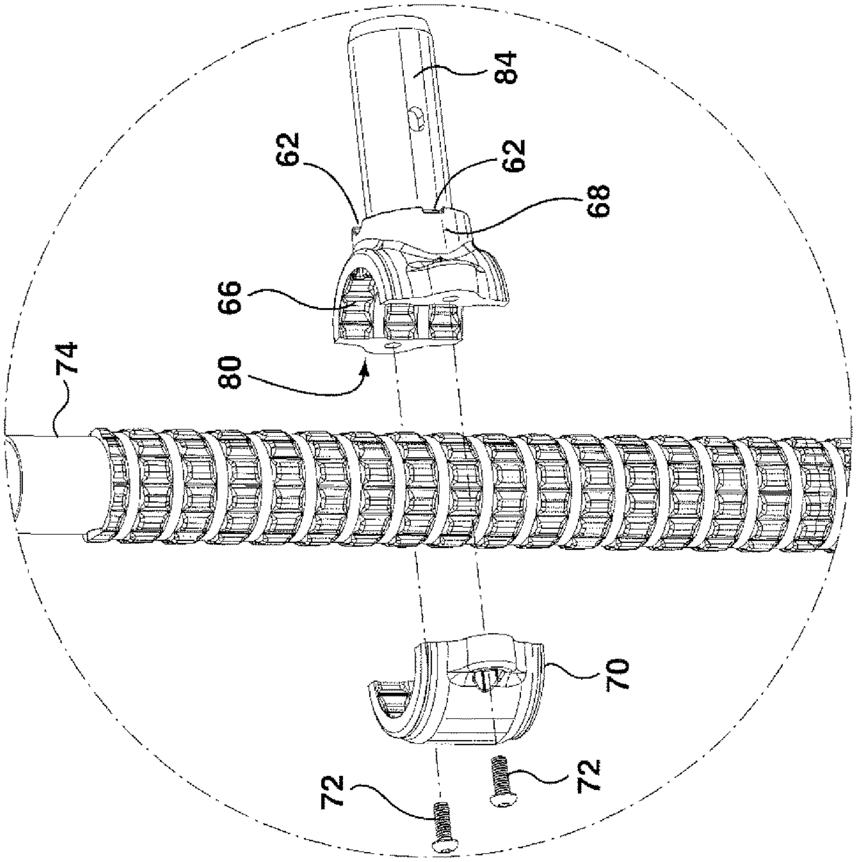
FIG. 5A is an enlarged view of a portion of the safety grip system shown in FIG. 5.
Figure 6A:
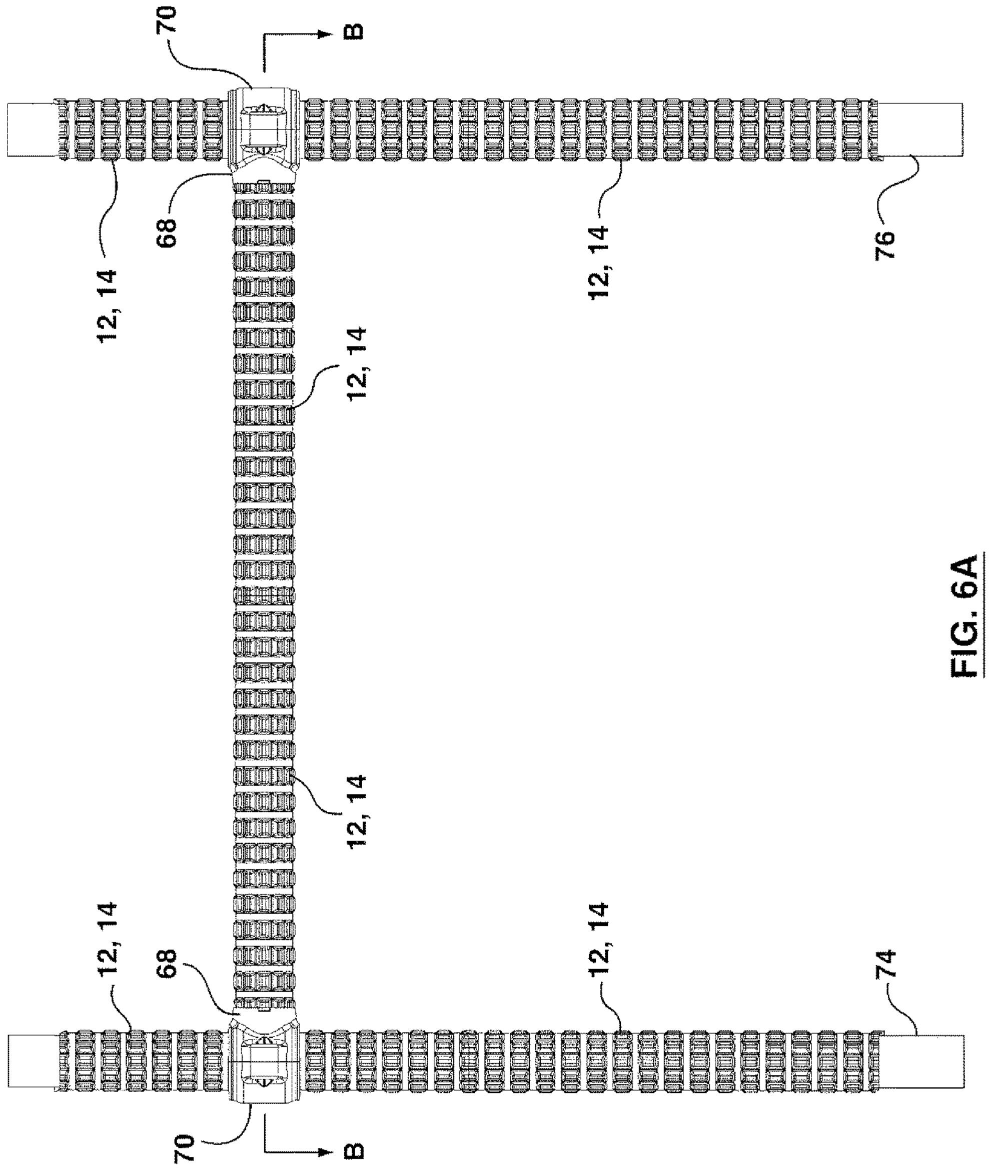
FIG. 6A is an assembled view of the embodiment of FIG. 5.
Figure 6B:
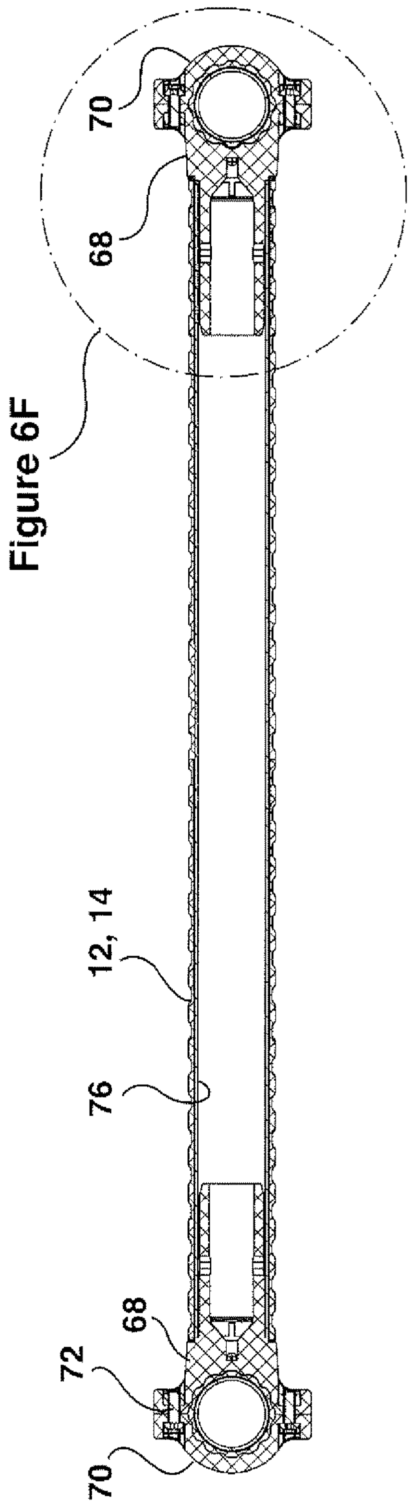
FIG. 6B is a cross-section along the line B-B in FIG. 6A.
Figure 6C:
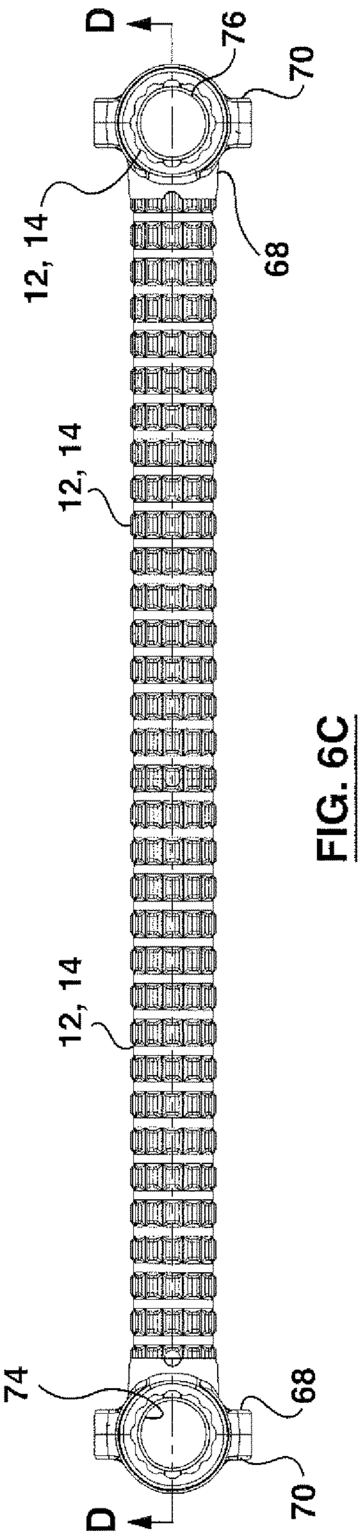
FIG. 6C is a top plan view of the embodiment of FIG. 5.
Figure 6D:
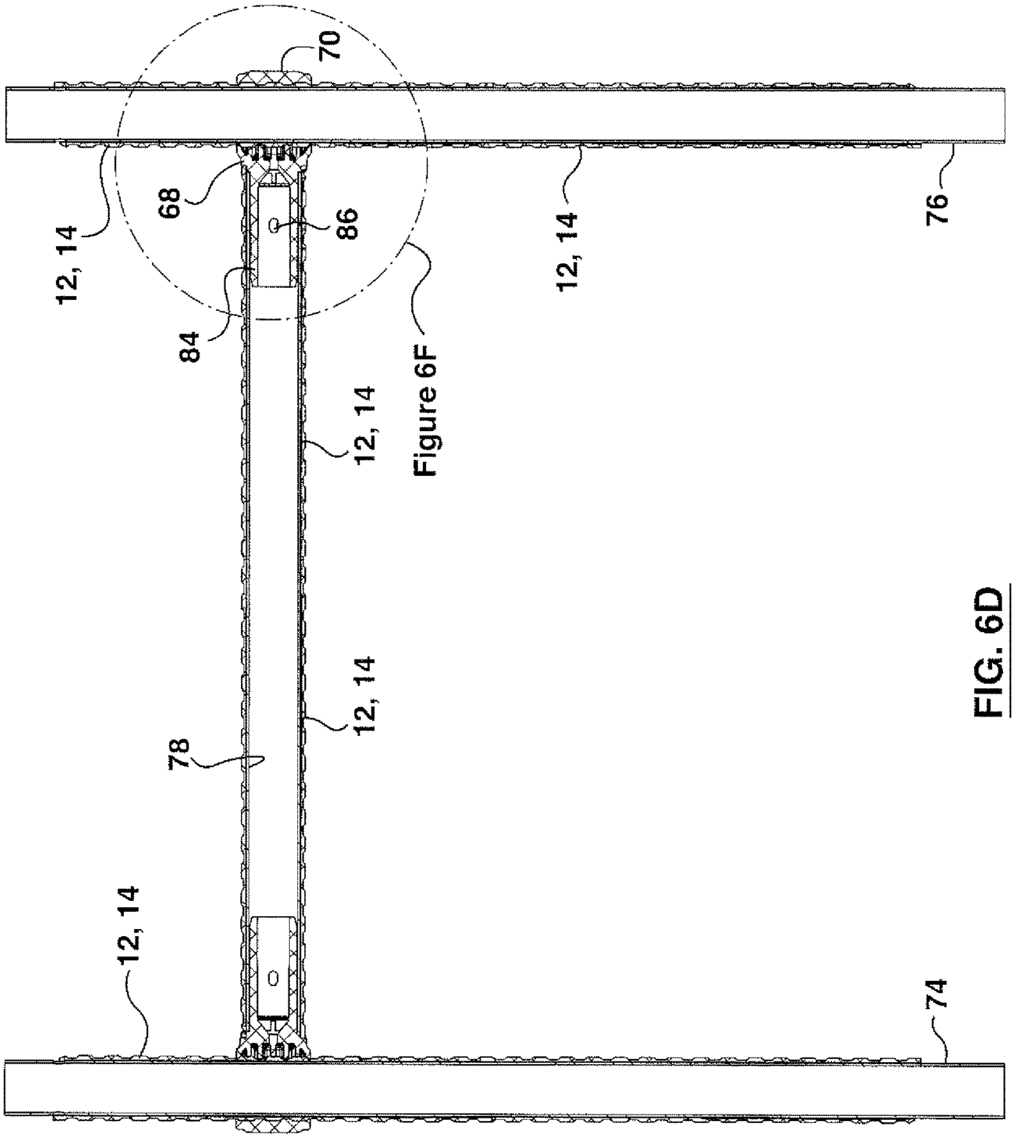
FIG. 6D is a vertical section through the embodiment of FIG. 6A.
Figure 6E:
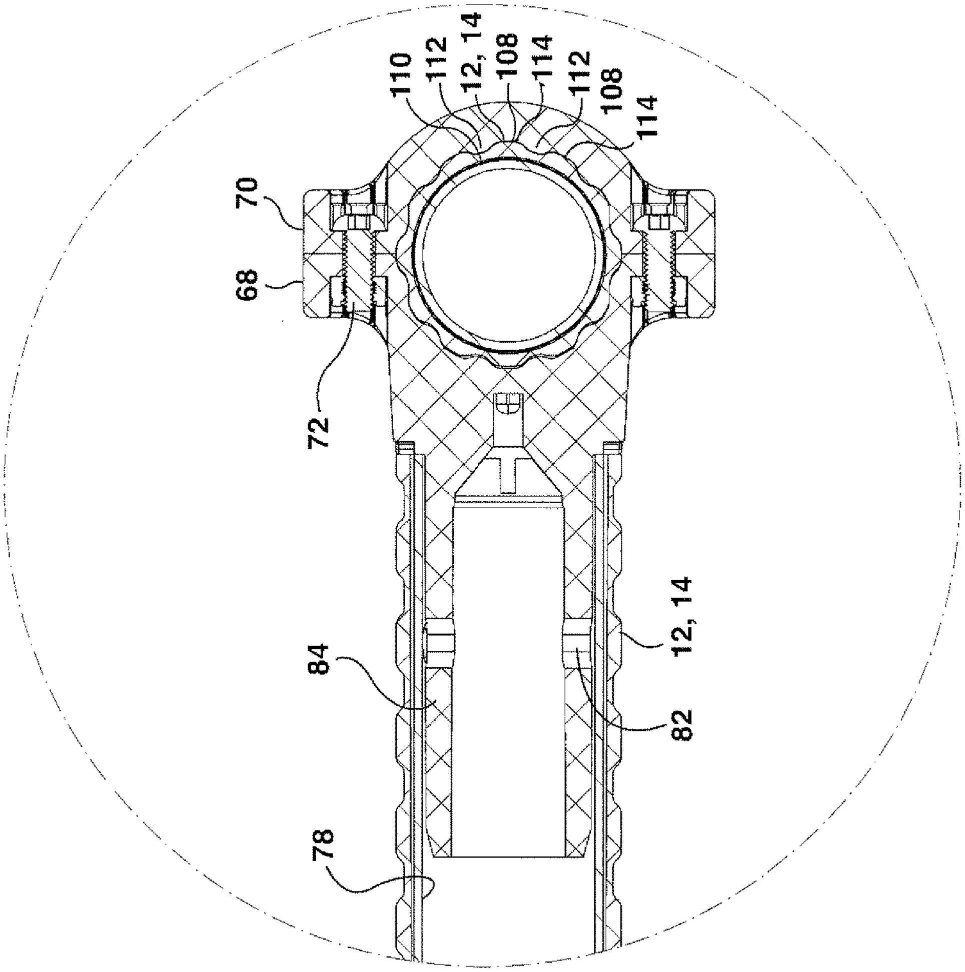
FIG. 6E is an enlargement of the area shown in FIG. 6B.
Figure 6F:
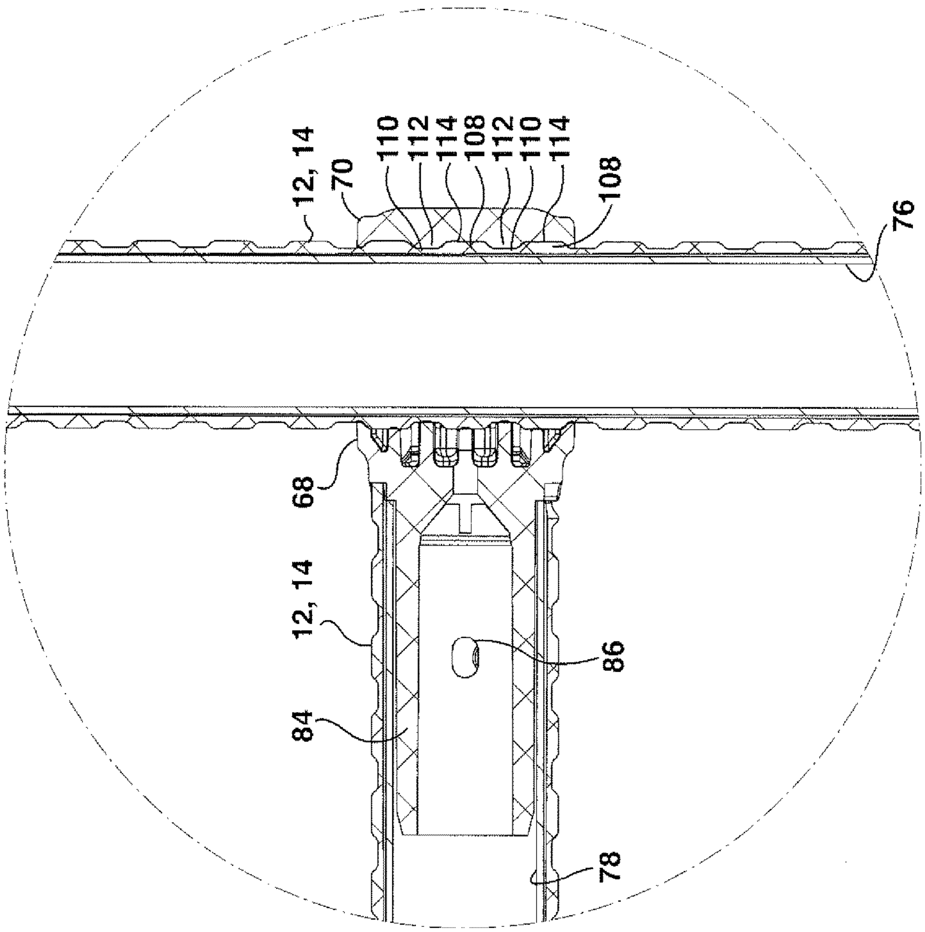
FIG. 6F is an enlargement of the area shown in FIG. 6D.

Alternately, or in addition, a portion of the support structure may be utilized to itself non-rotatably secure a safety grip in position. Referring to FIGS. 3G and 4B, an opening 58 may be provided in a safety grip 12 (e.g. end member 16). Opening 58 is sized to receive therein a second support member (e.g. side vertical rail 22 of the bed rail of the embodiment of FIG. 1 or wall mount rail 28 of the grab bar of the embodiment of FIG. 3A). It will be appreciated that once rail 22, 28 is positioned in opening 58, end member 16 will be non-rotatably secured in position. In addition, end member 16 will be non-longitudinally moveable.

It will be appreciated that if one of the safety grips 12 is secured in position by one or more the means discussed herein (i.e., the secured safety grip), then a second safety grip 12, if inter-engaged with the secured safety grip, may also be non-rotatably secured in position. For example, referring to the embodiments of FIGS. 1, 3A and 3E, if end members 16 are secured in position, and if intermediate safety grips 14 are inserted between and are inter-engaged, then the intermediate safety grips 14 will be non-rotationally and non-longitudinally mounted on support structure 18 without in fact being secured thereto.

An advantage of this design is that fewer attachment means may be utilized to secure a safety grip system on a support structure 18. A further advantage is that if a plurality of inter-engaged safety grips 12 are secured to support structure 18, then should one of the securing means fail so that a safety grip 12 is no longer secured directly on support structure 18, then the inter-engagement of that safety grip 12 with other safety grips 12 of the safety grip system 10 can maintain the loosened safety grip 12 in position. For example, referring to FIG. 3B, should screw 54 come loose, then intermediate safety grip 14*a* through which screw 54 passed would no longer be secured to cross rail 26. However, due to the inter-engagement of the intermediate safety grip 14*a* with adjacent intermediate safety grips 14*b* and 14*c*, intermediate safety grip 14*a* will remain in position and intermediate safety grips 14*b* and 14*c* will inhibit the rotation of the intermediate safety grip 14*a* about cross rail 26. It will be appreciated that intermediate safety grips 14*b* and 14*c* may themselves be secured directly to cross rail 26 such as by a screw, adhesive or the like. However, if intermediate safety grips 14*b* and 14*c* are themselves not directly secured to cross rail 26, the inter-engagement of intermediate safety grip 14*b* with end member 16*a*, and the inter-engagement of intermediate safety grip 14*c* with end member 16*b* will inhibit the rotation of intermediate safety grips 14*b* and 14*c* about cross rail 26, which in turn, will inhibit the rotation of intermediate safety grip 14*a* about cross rail 26.

In accordance with an embodiment of this invention, at least two of the safety grips 12 of safety grip system 10 are inter-lockable such that when one of the safety grips is non-rotatably mounted to support structure 18, the other safety grip 12 is also non-rotatably mounted to the support structure 18. Preferably, all of the safety grips 12 of a safety grip system 10 are inter-locked. The safety grips 12 may be inter-locked by any means known in the art. Preferably, the safety grips are mechanically interlocked by male and female engagement members that are provide on safety grips 12 and, more preferably, are integrally formed as part of safety grips 12.

As exemplified in FIGS. 3G and 4A-4B, the safety grips 12 may have mating inter-engagement members. For example, one of the safety grips 12 may have one or more male engagement members 60 and an adjacent safety grip 12 may have one or more female engagement members 62. Preferably, as shown in FIG. 4A, each safety grip 12 may have both male and female engagement members 60 and 62.

FIG. 4A exemplifies a preferred inter-engagement system. As shown therein, safety grip 12 is a longitudinally extending member having a longitudinal axis A. Male engagement member 60 comprises one or more longitudinally extending fingers that is receivable in a mating recess (female engagement member 62) provided on an adjacent safety grip 12. The inter-engagement of finger 60 into a mating recess 62 prevents relative rotation of one safety grip 12 with respect to another safety grip 12. Preferably, each safety grip 12 has a plurality of male engagement members 60 and a plurality of female engagement members 62. As shown in FIG. 4A, safety grip 12 has two male engagement members 60 at one end and two female engagement members 62 at the same end.

It will be appreciated that it is preferred that each safety grip 12 of the same safety grip system 10 has the same number of male and female engagement members 60 and 62 in the same angularly displaced position such that any safety grip 12 of the system may inter-engage with another safety grip 12 of the same system. Accordingly, as exemplified, each safety grip 12 of the system shown in FIGS. 4A-4D has two male engagement members 60 and two female engagement members 62 which are spaced apart by the same angular displacement (e.g. 90° as exemplified in FIG. 4A). Accordingly, any safety grip 14, 16 of system 10 shown in FIGS. 4A-4D may inter-engage with another safety grip of the same system.

FIGS. 5, 5A and 6A-6F exemplify an alternate embodiment which uses an alternate type of interlocking safety grip 12. In this embodiment, for illustration purposes, support structure 18 comprises first and second poles 74, 76 which are spaced apart by a cross rail 78. One or both poles 74, 76 may be secured to a floor and/or ceiling by any means known in the art. As exemplified, safety grip system 10 utilizes one or more intermediate safety grips 14 on cross rail 78 and one or more safety grips 64 which overlie safety grips provided on poles 74, 76. In this embodiment, the inter-engagement of inner surface 66 of safety grip 64 with the textured outer surface 50 of safety grip 12 inhibits the relative motion of safety grip 12 with respect to safety grip 64. Referring to FIGS. 5, 5A 6E and 6F, safety grip 64 which overlies safety grip 14 comprises first and second portions 68 and 70 which may be secured together by any means known in the art such as an adhesive, welding or a mechanical fastener such as screws 72.

The first portion 68 of safety grip 64 may be mounted to support structure by any means known in the art. For example, first portion 68 of safety grip 64 may be secured to cross rail 78 by any means known in the art such as an adhesive, welding or a mechanical securing means, such as set screws 82. Preferably, as exemplified, first portion 68 has a rod like extension 84 which is receivable in the interior of cross rail 78 and is secured in position by, e.g., set screws 82 which extend through cross rail 78 and are received in openings 86 of rod like extension 84.

Pole 74, 76 with one or more intermediate safety grips 12 provided thereon, may then be positioned to mate with open end 80 of first portion 68. The second portion 70 of safety group 64 may then be secured to first portion 68 of safety grip 64 by any means know in the art, such as by means of an adhesive, welding, mechanical securing means such as screws 72 or the like.

In order to non-rotatably secure intermediate safety grip 12 in position with respect to overlying safety grip 64, the profile of inner surface 66 of safety grip 64 may be configured to inter-engage with the outer surface (textured outer surface 50) of safety grip 12. For example, as shown in particular in FIGS. 5A, 6E and 6F, the interior surface of safety grip 64 may be provided with a plurality of recesses which inter-engage with the recesses and protrusions provided on textured outer surface safety grip 14. Accordingly, when safety grip 64 is secured together (i.e. first and second portions 68 and 70 are secured together by screws 72 so as to surround and overlie safety grip 12), safety grip 12 is non-rotationally mounted in position with respect to safety grip 64.

An advantage of this embodiment is that the first safety grip member (safety grip 64) extends in a first direction which is different to the direction in which a second safety grip (safety grip 12) extends. Accordingly, by clamping safety grip 64 on safety grip 12, axial and rotation movement of safety grip 12 is inhibited. In addition, if a safety grip 12 is non-longitudinally moveably mounted on support pole 74, then another safety grip 12 may be non-linearly moveably mounted on support pole 76. Accordingly, the mounting of one safety grip to one portion of the support structure 18 may inhibit the longitudinal and/or rotational movement of another safety grip 12.

Figure 7:
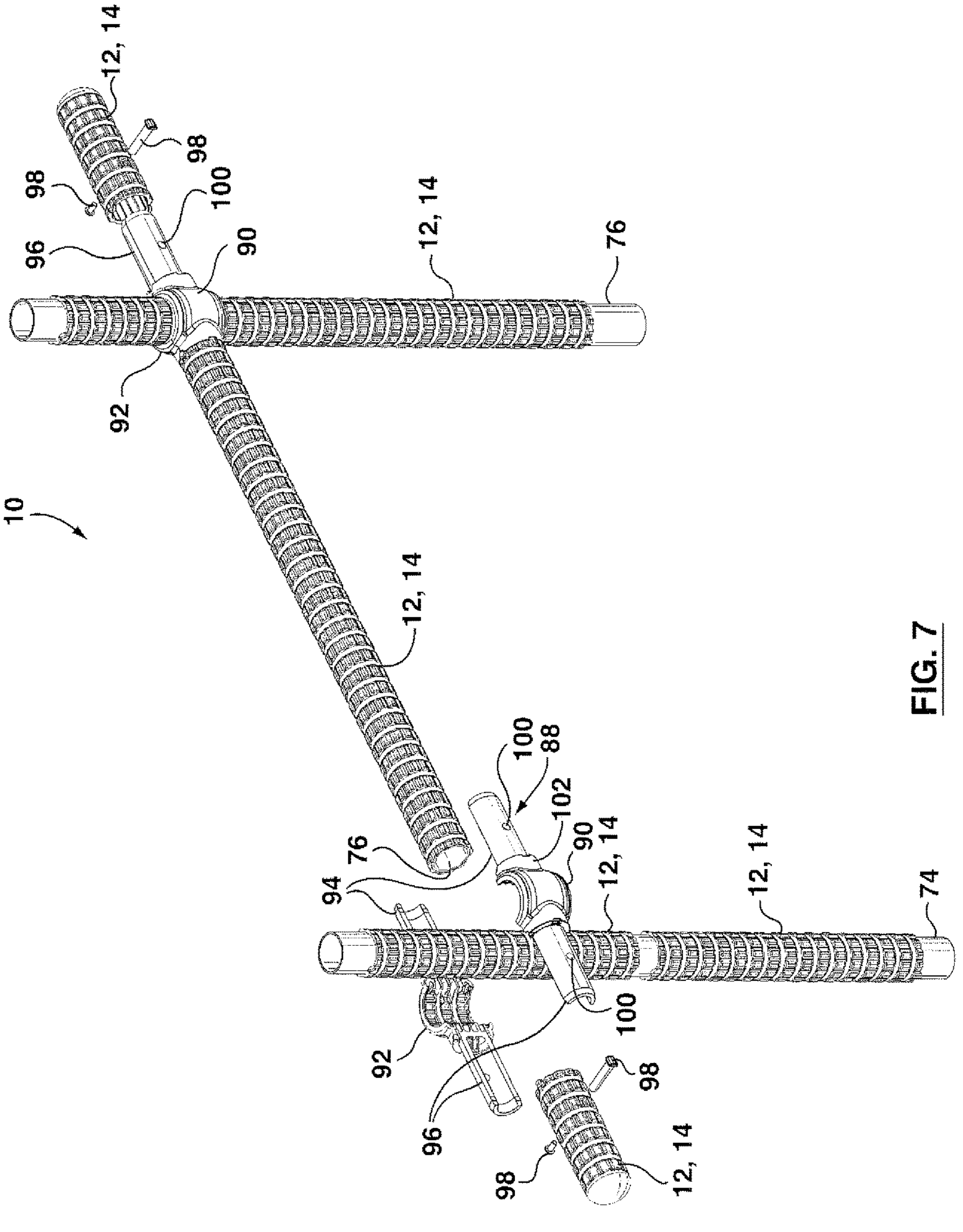
FIG. 7 is a partially exploded view of a further alternate embodiment.

A further alternate embodiment of the safety grip system 10 is shown in FIG. 7. Once again, this embodiment exemplifies a support structure which utilizes first and second poles 74, 76 (which may be secured to a floor and/or ceiling as is known in the art) and a cross rail 76. A plurality of intermediate safety grips 14 are provided on poles 74, 76 and cross rail 76. In this embodiment, overlying safety grip 88 is provided. Overlying safety grip 88 comprises first and second inter-lockable portions 90 and 92. In this case, first and second portions 90, 92 have opposed longitudinally extending rod like extensions 94, 96 which extend in the opposite directions. When first and second portions 90 and 92 are secured together, a rod-like extension is formed which is insertable into the open end of adjacent safety grips 12. For example, as shown in FIG. 7, assembled first and second portions 90 and 92 may define a rod 96 which is insertable into an open end of end member 16. End member 16 may be secured on rod 96 by any means known in the art such as an adhesive, or mechanical means such as set screws 98 which extend through the sidewall of end member 16 and are received in openings 100. Similarly, intermediate safety grip 14 may be non-rotatably mounted to cross rail 76 by an adhesive, mechanical means or the like. Further, intermediate member and/or cross rail 76 may be secured to a rod 94 by any means known in the art such as an adhesive, a screw which is receivable in opening 100 or any other means known in the art.

In a preferred embodiment, intermediate member 14 may have a plurality of inter-engagement members, such as male and female inter-engagement members 60 and 62, which mate with like members provided on hub portion 102 of safety grip 88.

It will be appreciated that some, and preferably all, of safety grips 12 are constructed from a hollow, rigid material such as a rigid plastic or fibre glass. An advantage of this design is that the safety grip 12 will not deform when stress is applied thereto, such when a person places their hand on safety grip 12 and utilizes safety grip 12 to support or move themselves. Optionally, it will be appreciated that a compressible layer 120, such as a natural or synthetic rubber or foam, may be provided on exterior surface 50 so as to provide a softer grip surface for use by a user. This layer preferably conforms to the texturing of exterior surface 50. Layer 120 may be provided on one or all of safety grips 12 and, on each safety grip on which layer 120 is provided, it may be provided on part or all of the safety grip 12.

Optionally, some or all of safety grips 12 may be luminescent. For example, a luminescent coating may be provided to some or all of exterior surface 50. Alternately, some or all of safety grips 12 may be constructed from a luminescent material or may incorporate a luminescent material. Any luminescent material known in the art may be incorporated and any rigid luminescent material may be used to construct the safety grips 12. Preferably, each safety grip 12 is constructed integrally (e.g. it is molded as a single piece).

In one embodiment, textured exterior surface 50 may be of any particular design. Preferably, textured exterior surface 50 may comprise a plurality of longitudinally spaced apart raised bands 104 which are separated by finger receiving bands 106 (see for example FIG. 4A). Preferably, finger receiving bands 106 are recessed inwardly with respect to raised bands 104. An advantage of this design is that an improved grip is provided. In particular, a user may position their fingers so as to be received on or in the finger receiving bands 106. Preferably, as exemplified in FIGS. 4A-4D, raised band 104 may comprise a plurality of raised projections 108. Raised projections 108 are preferably spaced apart circumferentially and extend circumferentially around the peripheral main body 48. For example, raised projections may have a height from 0.5-5 mm and, more preferably from 1-3 mm. Finger receiving bands 106 are preferably spaced apart so as to receive part or all of a finger of a user therein and preferably have a continuous smooth surface.

An advantage of textured exterior surface 50 is that it may serve two functions if an overlying safety grip 64, 88 is provided. For example, referring to FIGS. 6E and 6F, inner surface 66 of safety grip 64, 88 may be provided with the plurality of projections 112 and recess portions 114 which mate with projections 108 and recess portions 110 of exterior surface 50 of safety grip 12. Accordingly, the textured outer surface 50 may serve a dual purpose of providing a grip surface and also inhibiting the movement of one safety grip 12 with respect to another safety grip 12.

It will be appreciated that a safety system 10 may use one or more the features disclosed herein. Further, it will be appreciated that what has been described herein has been intended to be illustrative of the invention and non-limiting and it will understood by a person skilled in the art that various variants and modifications may be made without departing from the scope of the invention as defined in any of the claims appended hereto.

The invention claimed is:

1. A support structure system comprising a first support structure that extends longitudinally, a second support structure that extends transverse to the first support structure, first and second safety grips and an interlocking member, the first safety grip is positioned on an outer surface of at least a portion of the first support structure whereby a textured exterior surface of the first safety grip extends longitudinally, the second safety grip is positioned on an outer surface of at least a portion of the second support structure whereby a textured exterior surface of the second safety grip extends transversely, the interlocking member overlies and interlocks with the second safety grip and has a longitudinally extending member, wherein the interlocking member comprises first and second curved portions that are secured together around the exterior surface of the second safety grip, wherein the first curved portion has the longitudinally extending member that is received in the first support structure, and wherein the first safety grip is interlocked with the first curved portion by at least one longitudinally extending finger that is receivable in a longitudinally extending recess of the first curved portion.

2. The support structure system of claim 1 wherein the textured exterior surface of the first safety grip is luminescent.

3. The support structure system of claim 1 wherein the first safety grip is made of a luminescent material.

4. The support structure system of claim 1 wherein the textured exterior surface comprises a plurality of projections having a height of from 0.5 mm to 5 mm.

5. The support structure system of claim 1 wherein the textured exterior surface comprises a plurality of projections having a height of from 1 mm to 3 mm.

6. The support structure system of claim 1 wherein the first support structure non-rotatably engages the longitudinally extending member of the interlocking member.

* * * * *